United States Patent
Klein

(10) Patent No.: US 9,034,242 B2
(45) Date of Patent: May 19, 2015

(54) METHOD FOR PRODUCING A PLASTIC ARTICLE AND BLOW MOULD FOR CARRYING OUT THE METHOD

(75) Inventor: Martin Klein, St. Augustin (DE)

(73) Assignee: Kautex Maschinenbau GmbH, Boon (DE)

( * ) Notice: Subject to any disclaimer, the term of this patent is extended or adjusted under 35 U.S.C. 154(b) by 114 days.

(21) Appl. No.: 13/807,965

(22) PCT Filed: Jun. 17, 2011

(86) PCT No.: PCT/EP2011/003026
§ 371 (c)(1),
(2), (4) Date: Jan. 2, 2013

(87) PCT Pub. No.: WO2012/000621
PCT Pub. Date: Jan. 5, 2012

(65) Prior Publication Data
US 2013/0099425 A1    Apr. 25, 2013

(30) Foreign Application Priority Data

Jul. 2, 2010    (DE) .......................... 10 2010 025 937

(51) Int. Cl.
*B29C 49/20*    (2006.01)
*B29C 49/18*    (2006.01)
(Continued)

(52) U.S. Cl.
CPC ................ *B29C 49/20* (2013.01); *B29C 49/18* (2013.01); *B29C 49/30* (2013.01); *B29L 2031/7172* (2013.01); *B29C 49/04* (2013.01); *B29C 49/4268* (2013.01); *B29C 49/48* (2013.01); *B29C 2049/2008* (2013.01); *B29C 2049/2073* (2013.01); *B29C 2049/4807* (2013.01); *B29C 2049/481* (2013.01); *B29C 2049/4882* (2013.01);
(Continued)

(58) Field of Classification Search
None
See application file for complete search history.

(56) References Cited

U.S. PATENT DOCUMENTS 3,050,773 A    8/1962  Hagen
3,300,556 A    1/1967  Battenfeld et al.
(Continued)

FOREIGN PATENT DOCUMENTS

CA    2654106 A1    1/2008
DE    1245579 B     7/1967
(Continued)

OTHER PUBLICATIONS

PCT International Search Report mailed Feb. 20, 2013, received in corresponding PCT Application No. PCT/EP2011/003026, 3 pgs.
(Continued)

*Primary Examiner* — Monica Huson
(74) *Attorney, Agent, or Firm* — Grossman Tucker Perreault & Pfleger, PLLC

(57)    ABSTRACT

The invention relates to a method for producing a plastics material article, said method including the extruding of a tube-shaped parison and the re-forming of the parison into a hollow body within a blow mold by applying differential pressure. The method includes initially a first expanding and partial shaping of the parison with the blow mold not completely closed. Then at least one opening is provided on the circumference of the pre-expanded parison. In a further step at least one part to be built-in is introduced through the opening into the interior of the partially shaped plastics material article. In a final step the blow mold is closed completely and the blow molding of the plastics material article is completed.

20 Claims, 9 Drawing Sheets

Figure 1:
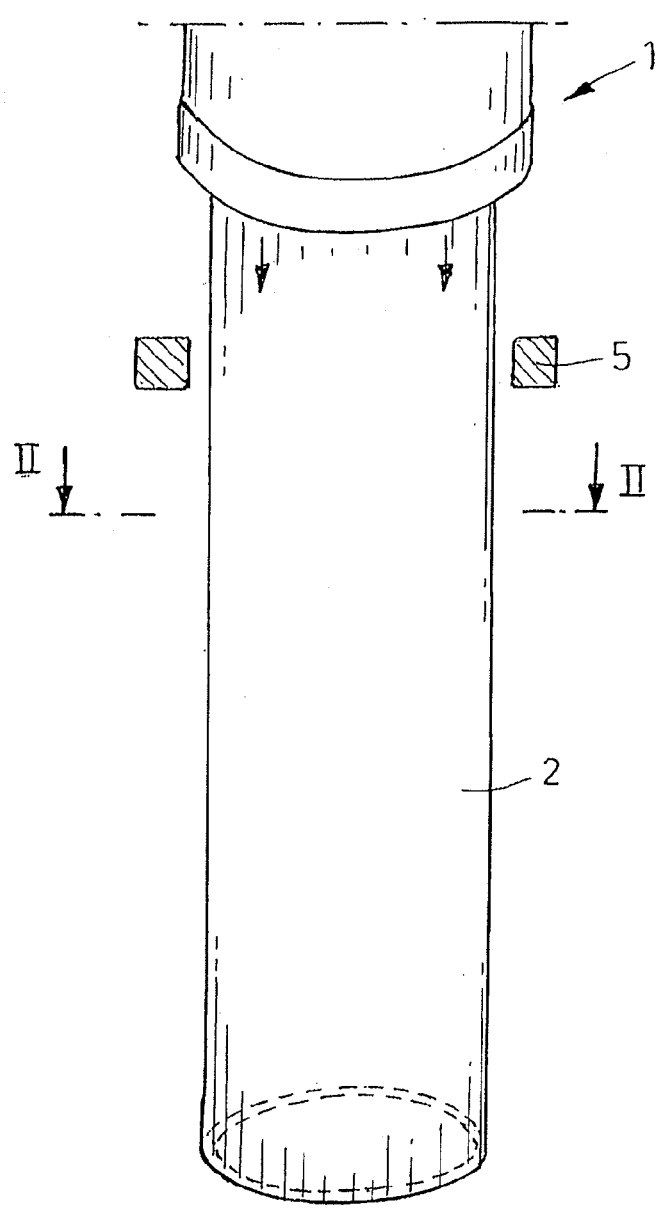

(51) Int. Cl.
  *B29C 49/30* (2006.01)
  *B29C 49/48* (2006.01)
  *B29L 31/00* (2006.01)
  *B29C 49/04* (2006.01)
  *B29C 49/42* (2006.01)

(52) U.S. Cl.
  CPC . *B29C 2793/0018* (2013.01); *B29C 2793/0081* (2013.01)

(56) References Cited

U.S. PATENT DOCUMENTS

| | | | | |
|---|---|---|---|---|
| 4,719,072 | A | * | 1/1988 | Kojima et al. ............. 264/515 |
| 5,326,514 | A | * | 7/1994 | Linden et al. ............. 264/83 |
| 6,978,802 | B2 | | 12/2005 | Hagano et al. |
| 7,175,791 | B2 | | 2/2007 | Pappert et al. |
| 7,993,127 | B2 | * | 8/2011 | Hamaji et al. ............. 425/503 |
| 8,287,796 | B2 | | 10/2012 | Buchholz et al. |
| 2009/0102102 | A1 | * | 4/2009 | Borchert et al. ............. 264/540 |
| 2012/0161373 | A1 | | 6/2012 | Heim et al. |

FOREIGN PATENT DOCUMENTS

| | | |
|---|---|---|
| DE | 2933212 A1 | 2/1981 |
| EP | 110697 B1 | 3/1987 |
| GB | 882790 A | 11/1961 |
| JP | S5651333 A | 5/1981 |
| JP | H04193521 A | 7/1992 |
| JP | H06064026 A | 3/1994 |
| WO | 2005118255 A1 | 12/2005 |

OTHER PUBLICATIONS

PCT Translation of the International Preliminary Report on Patentability/Written Opinion issued May 8, 2013, received in corresponding PCT Application No. PCT/EP2011/003026, 14 pgs.

English translation of Japanese Notification of Reasons For Refusal mailed Jan. 20, 2015, received in corresponding Japanese Patent Application No. 2013-517064, 4 pgs.

* cited by examiner

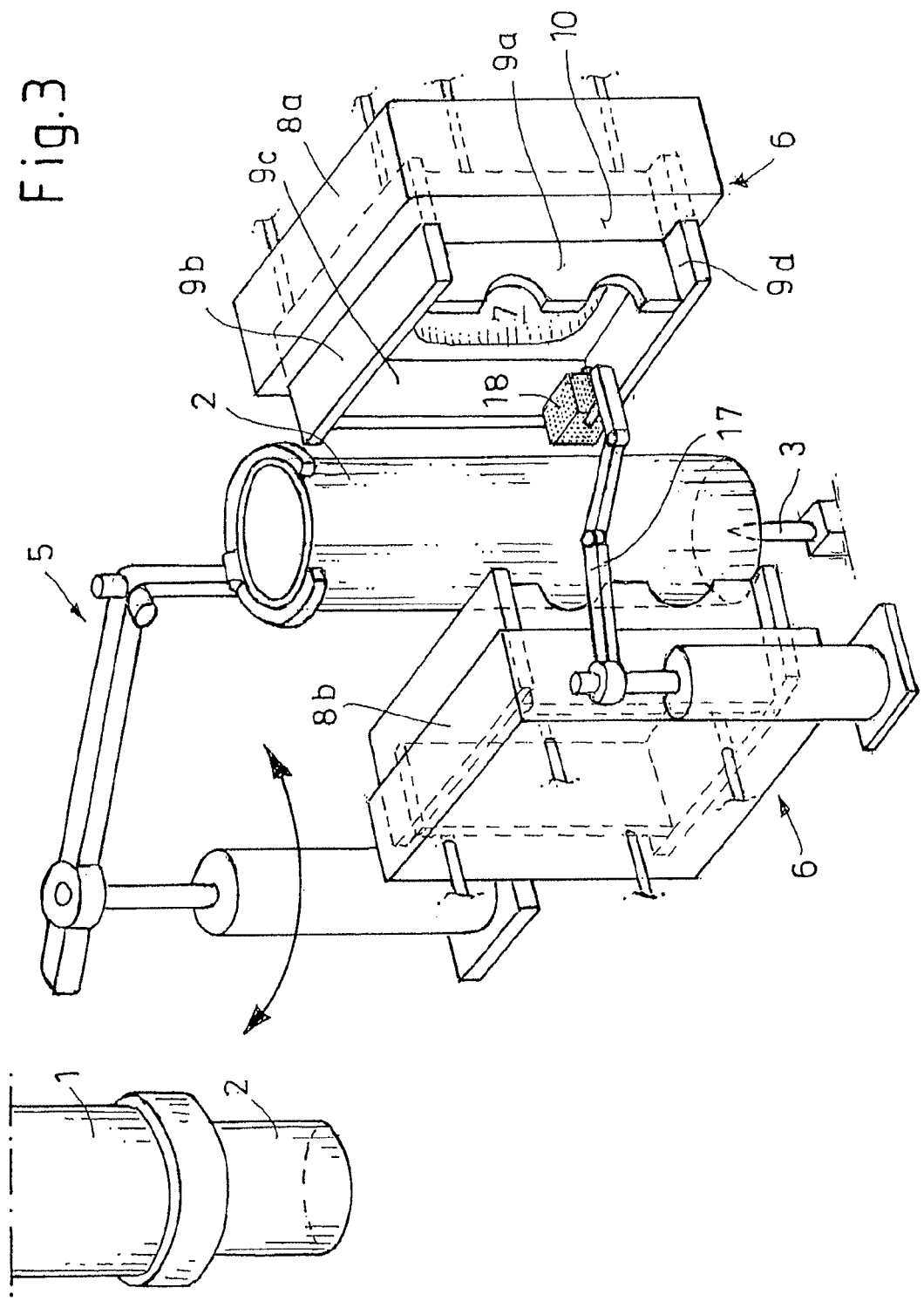

METHOD FOR PRODUCING A PLASTIC ARTICLE AND BLOW MOULD FOR CARRYING OUT THE METHOD

The invention relates to a method for producing a plastics material article and to a blow mold for carrying out the method.

In particular in the production of large plastics material containers by means of extrusion blow molding, it is frequently desirable to introduce parts to be built-in into the container to be completed. For example, motor vehicle fuel containers produced from thermoplastic plastics material are frequently provided with operating components/parts to be built-in which are either introduced manually through one or several inspection openings provided in the container after said container has been produced or are also blow-shaped by means of extrusion blow molding when the container is being shaped. It is known for this purpose to place the parts be built-in which are to be introduced into the container in position on a mandrel/carrier and to arrange them between the open halves of a blow mold in such a manner that the parison tube of thermoplastic material, extruded above the blow mold, is extruded over the carrier and the components arranged thereon. In this case, the tube is reverse drawn over the operating component carrier and the operating components. The mold halves of the blow mold are then closed about the carrier and the operating components arranged thereon. The operating components are welded to the wall of the subsequent container directly prior to or during the completion of the blow molding of the finished article inside the closed blow mold.

Such a method is known, for example, from DE 602 18 237 T2. The described blow-shaping of parts to be built-in according to the ship-in-a-bottle principle is applied among other things whenever the parts to be built-in which are to be introduced into the container are larger than the inspection openings to be provided in said container.

In particular in the case of fuel containers of thermoplastic plastics material, the problem is that the plastics materials used for this purpose, as a rule HDPE, are not diffusion-tight to hydrocarbons. This is why fuel containers of thermoplastic plastics material are produced from co-extruded products with barrier layers for hydrocarbons. This makes it possible to ensure the tightness of the fuel container system in the most extensive manner, however, in the case of multiple-layer wall construction, the barrier layer is harmed/interrupted by openings that are to be provided subsequently in the container wall such that in the region of cutouts and/or service openings in the container wall, potential leakage points are created which have to be sealed in an expensive manner once the container has been completed.

Most recently, consequently, all efforts made are aimed at inserting into the fuel container, where possible, all the parts to be built-in as early as possible during the production of said fuel container in order to keep the number of openings necessary in the container wall as small as possible.

The so-called "blow-shaping" of parts to be built-in certainly does justice to this problem with regard to the size of the openings necessary in the container wall, the fastening of some of the parts to be built-in, such as for example valves or the like, nevertheless possibly requires harming the container wall in terms of piercing or penetrating it such that as a result there is no clear reduction in the number of openings required.

As an alternative to the aforedescribed method, the thermoforming of sheet-shaped parisons is known, each of which have been obtained from tube-shaped extruded products with a closed cross section. Methods for working sheet-shaped or tab-shaped extruded products with multiple-part molds in the manner of blow molds are also designated as so-called "twin sheet blow molding methods". Using such methods, it is possible, in principle, to be built-in in the interior of the container to be produced while the cavity is still being shaped, it being possible to provide the parts to be built-in at an arbitrary position in an arbitrary layout on the inner surface of the container.

EP 110 697 B1, for example, describes a method where the extruded product emerging from the extrusion head with a closed cross section is separated at two diametrically opposite sides such that two sheet-shaped parisons are obtained which are guided by means of a guide device and, prior to their shaping, are held at a mutual distance whilst an accessory, which is intended to be accommodated in the subsequent container, is inserted between the two parisons.

Said method is relatively favorable in particular with regard to the space available for handling the parts to be built-in, however it requires a high amount of expenditure on the equipment for guiding the still-warm plastic tab-shaped or sheet-shaped extruded products.

The object underlying the invention is to provide an alternative to the aforementioned method which is simplified in particular with regard to the handling of the extruded products.

The object is achieved initially by a method for producing a plastics material article, said method including the extruding of a tube-shaped parison and the re-forming of the parison into a hollow body within a blow mold by applying differential pressure, wherein initially a first expanding and partial shaping of the parison is carried out with the blow mold not completely closed, then at least one opening is provided on the circumference of the pre-expanded parison and in a next step at least one part to be built-in is introduced through the opening into the interior of the partially shaped plastics material article, and in a further step the blow mold is closed completely and the blow molding of the plastics material article is completed.

The term "blow mold" in terms of the invention refers to a mold which has at least two blow mold halves each with a cavity, said blow mold halves in the completely closed state forming a mold cavity for an article to be shaped. The blow mold halves can be arranged in each case on die platens and can be realized in one part or in multiple parts. Said blow mold halves can have slides in a known manner for the ejecting of undercuts or the like. Within the framework of the invention the blow mold can also have more than two mold parts which can be moved in relation to one another, the term "blow mold halves" being used below for the purposes of simplification.

The advantage of the method as claimed in the invention is that the closed tube-shaped extruded product can be worked in all cases. This makes it possible to produce the extruded product on conventional extrusion blow mold installations by using the known measures for axial and/or radial wall thickness control (WDS and PWDS). Over and above this, the expensive engineering concept of separating and dividing the tube to form sheets or tabs is omitted. Nevertheless, bulky parts to be built-in and also smaller parts to be built-in can be placed in position on the wall of the finished article in an arbitrary arrangement with regard to one another without the inside width of the extruded parison, for instance, having to be taken into account. No expensive carriers and mandrels are necessary to place the part to be built-in in position in the interior of the container.

The method as claimed in the invention can be summarized to the effect that said method provides the subsequent opening of the already pre-expanded and partially pre-formed parison, in such a manner that the interior of the article, which is not yet completed, is freely accessible for manipulations and in particular for the attaching of parts to be built-in. The method combines the advantages of classic extrusion blow molding from the closed tube with that of the so-called "twin sheet blow molding method".

By the parison being open on the one side, one or several inserts or parts to be built-in can be introduced into the interior of the container between the not completely closed blow mold halves by means of a manipulator and fastened there, for example by means of welding to the still-warm plastics container wall.

The method as claimed in the invention provides for the shaping of the extruded product by utilizing the first heat, i.e. substantially without further melting of the material, it is not ruled out in this case that the part to be built-in and/or the container wall is heated in part in the region of the weld between the part to be built-in and the container to improve the weld connection.

In the case of an expedient development of the method as claimed in the invention, it is provided that the closing movement of the blow mold is effected in two steps, wherein in the first step of the closing movement at least one, preferably two extendible and retractable slides, which in each case frame or enclose the cavities of the blow mold, as shape inducing means, clamp the parison and form at least one opening between them.

By way of the slides/shape inducing means of the blow mold, the parison is initially clamped between said shape inducing means thus forming a "flash chamber", the parison already fitting closely in the cavities of the blow mold halves. The shape inducing means can preferably be tempered/heated.

In the case of an expedient variant of the method as claimed in the invention, it is provided that a pre-expanding of the parison is effected in such a manner that the parison abuts against the shape inducing means in the region of the opening of the shape inducing means, and in that the contour of the opening of the parison is realized approximately corresponding to the contour of the opening formed by the shape inducing means.

The amount of pre-expansion can be selected, for example, such that the parison extends out of the opening formed by the shape inducing means or extends into said opening.

The opening in the parison can be generated from the outside through the opening formed by the shape inducing means by a suitable separating device, for example by means of a cutting device, for example by means of a blade which can also be realized as a hot blade, a laser or a pot cutter, i.e. a pot-shaped cutting crown, the diameter of which corresponds approximately to the diameter of the opening formed by the shape inducing means. As an alternative to this, the opening can be generated by means of a stamping tool.

In an expedient manner, between the first step and the second step of the closing movement, the parison is expanded into the blow mold halves and the parts to be built-in are inserted.

Although one part to be built-in is referred to below, the invention is to be understood such that several parts are obviously able to be brought into the article.

It is also possible to perform other manipulations inside the article to be finished through the side opening of the parison tube and through the opening between the blow mold halves.

The method as claimed in the invention can refer to the production of a fuel container, however, the invention can also be understood such that any plastics material cavity can be produced using the method as claimed in the invention.

In place of one opening, it is also possible to provide several openings which can also be provided in each case for the accommodation of a blow mandrel.

In an expedient manner, the part to be built-in is introduced through the opening formed by the shape inducing means.

The expanding of the parison is effected to the extent as is necessary in order to produce an overlap between the parison tube and the shape inducing means and/or the crimp edges of the blow mold.

It is particularly expedient when the part to be built-in is introduced into the partially shaped parison by means of a preferably multiaxial manipulator.

In the case of an expedient variant of the method as claimed in the invention, it is provided that after at least one part to be built-in has been introduced and prior to the blow mold being closed completely, the parison is re-expanded, preferably by being acted upon by a blast of air.

The blast of air can be effected by means of a blow mandrel which is to be provided centrally at the bottom between the blow mold halves or by means of a blow mandrel which is to be inserted into the opening formed by the shape inducing means.

The object underlying the invention is additionally achieved by a method for producing a plastics material article, in particular for carrying out the method described beforehand, wherein the device includes at least two blow mold halves which form a mold cavity and which carry out an opening and closing movement in relation to each other, wherein at least one blow mold half, preferably both of them, is provided with at least one slide which frames or encloses the respective cavity as shape inducing means and is provided with at least one recess for forming an opening. The opening serves, on the one hand, for the production of an opening in the pre-expanded parison, on the other hand the opening can serve for the accommodation of a blow mandrel and/or for the guiding through of a manipulator, for example for the purposes of introducing parts to be built-in. The opening can also open out into an antechamber provided outside on the shape inducing means. Such an antechamber serves in an expedient manner for limiting the pressure when the parison is expanded into the opening. Said antechamber can be formed, for example, by a cover placed into position onto the opening from outside. Such a cover can be provided with an integrated separating device.

In the case of an expedient development of the device as claimed in the invention, it is provided that this includes at least one blow mandrel which has a circumferential sealing collar which can be moved into sealing abutment with the shape inducing means, which are moved to the stop member, during the expanding of the parison. By means of such a blow mandrel, the re-blowing or re-expanding of the parison can be brought about prior to the complete closing of the blow mold.

In an expedient manner, the shape inducing means are realized so as to be extendible into and retractable out of the parting plane of the blow mold halves, for example in a hydraulic manner.

To avoid too much flash, it is sensible when the shape inducing means are adapted to the contour of the cavities. In this case, the shape inducing means do not necessarily have to consist in each case of one single slide segment, rather they can consist of a plurality of slide segments which are arranged side by side in the parting plane of the blow mold halves.

In the case of an expedient development of the blow mold as claimed in the invention, it is provided that the shape inducing means are provided in the region of the recess on the inwardly pointing side thereof with means for stretching the parison during the expanding of the same.

This means that in an expedient manner thin positions, which simplify the introduction of openings, are generated in the parison in the antechamber cavity formed by the shape inducing means.

At least one circumferential projection or a strip with increased surface roughness, on which the parison tube is drawn thinly, is provided as means for stretching the parison.

In order to be able to keep the parison, when being re-expanded, in the antechamber cavity formed by the shape inducing means, it is sensible when the shape inducing means are provided on the inwardly pointing side thereof with vacuum bores. The parison can be held in said region whilst re-expanding or reblowing is carried out. Folds possibly occurring in the region of the antechamber cavity/flash chamber can be smoothed out in such a manner prior to the blow mold halves being completely closed and the blow molding of the article being completed. "Completing the blow molding" in terms of the invention refers to the cavity or the article being acted upon with a blast of air with the mold completely closed for the purposes of flushing and cooling the article.

Figure 2:
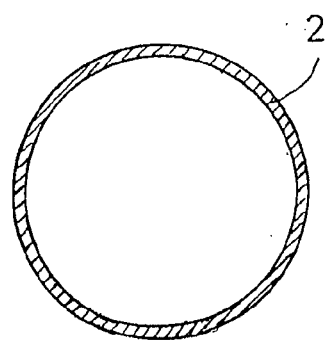
Figure 4A:
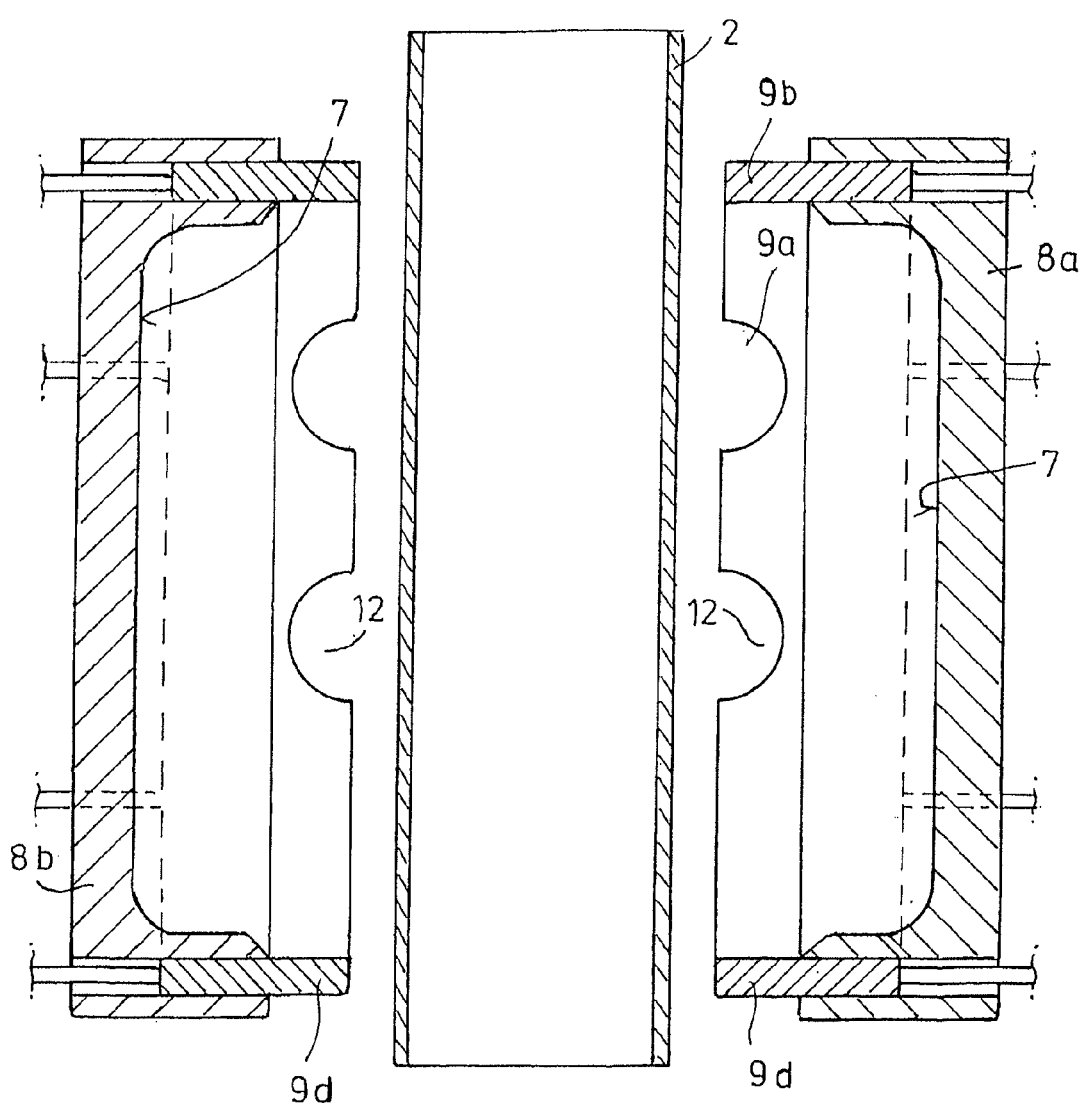
Figure 4B:
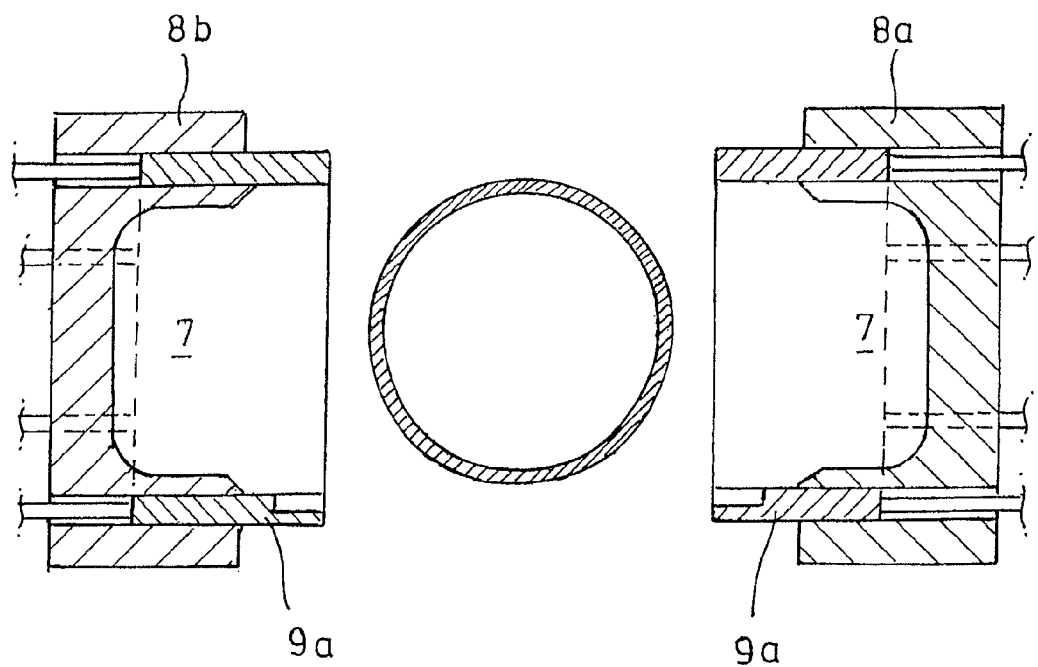
Figure 5A:
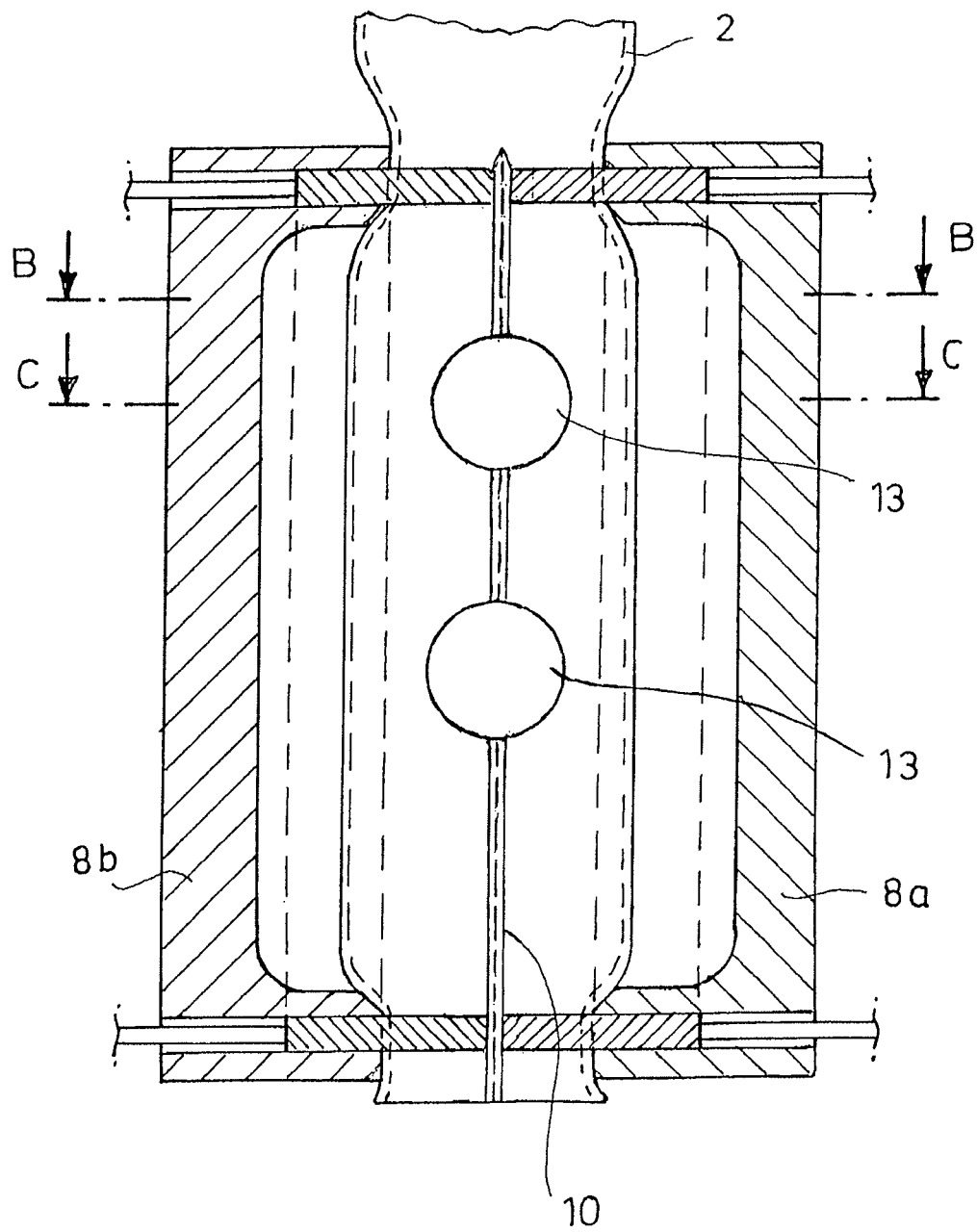
Figure 5B:
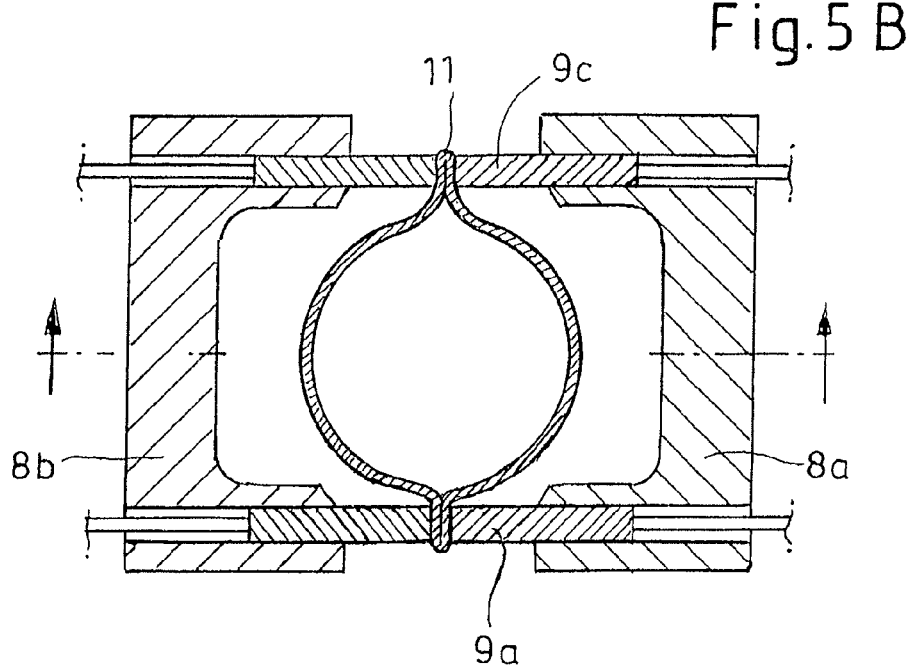
Figure 5C:
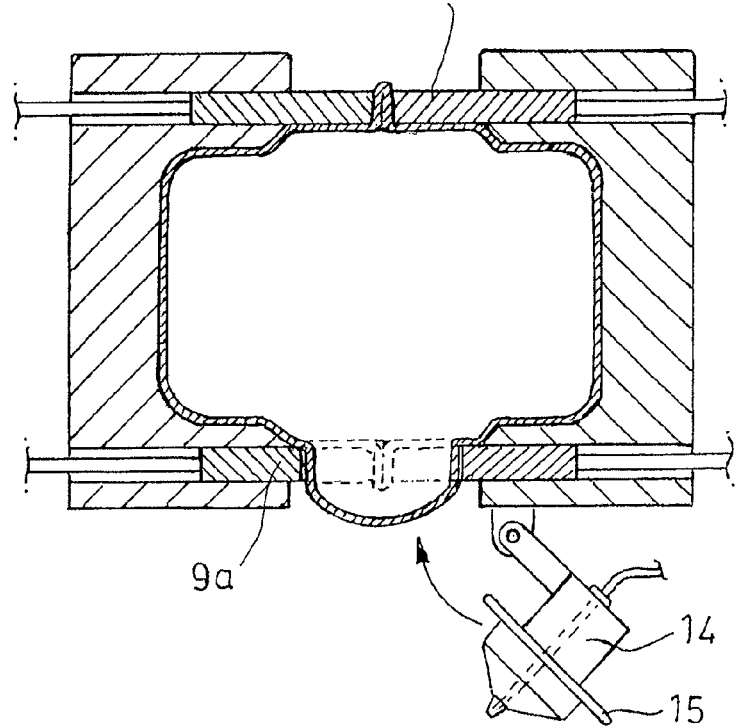
Figure 5D:
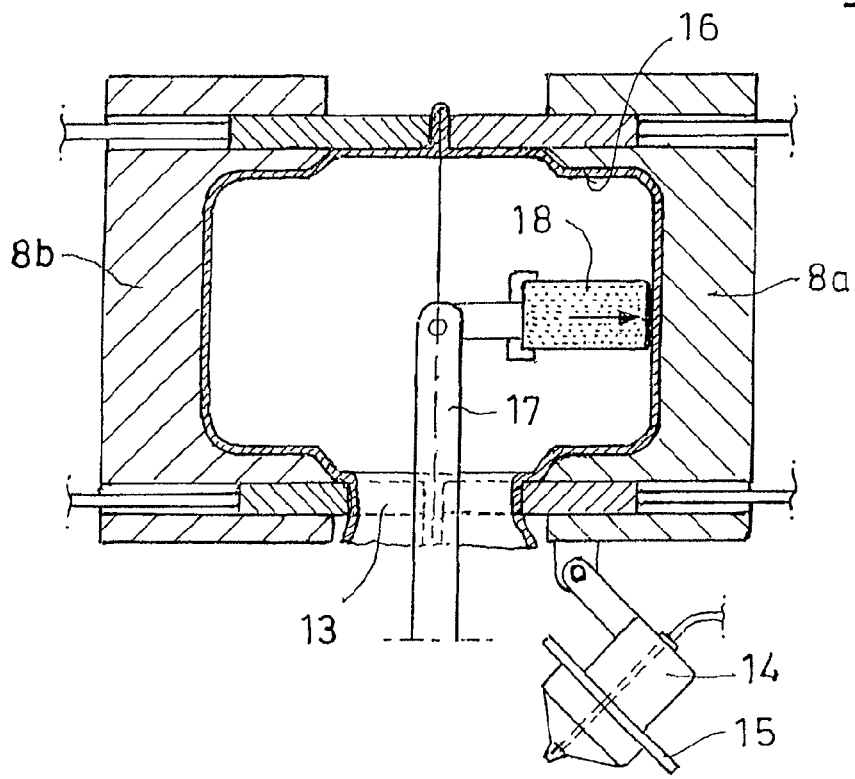
Figure 5E:
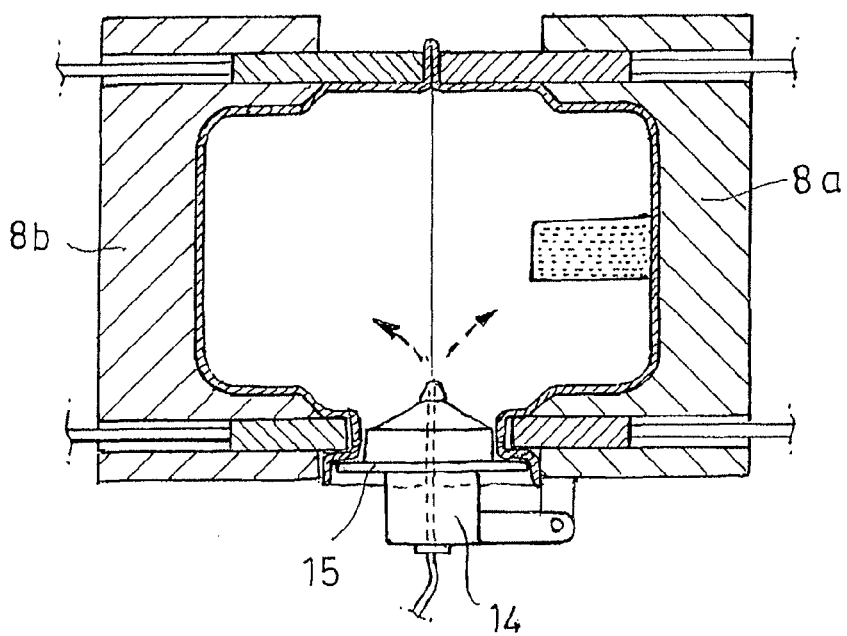
Figure 6A:
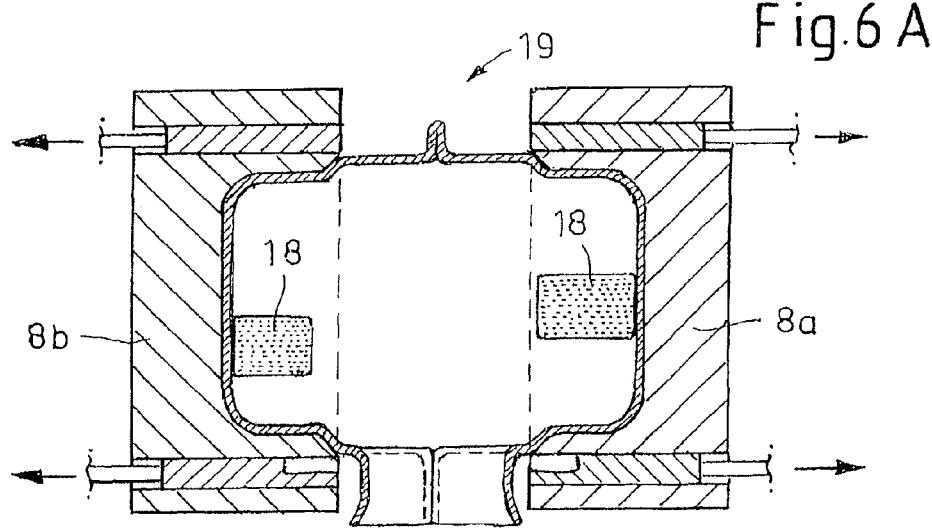
Figure 6B:
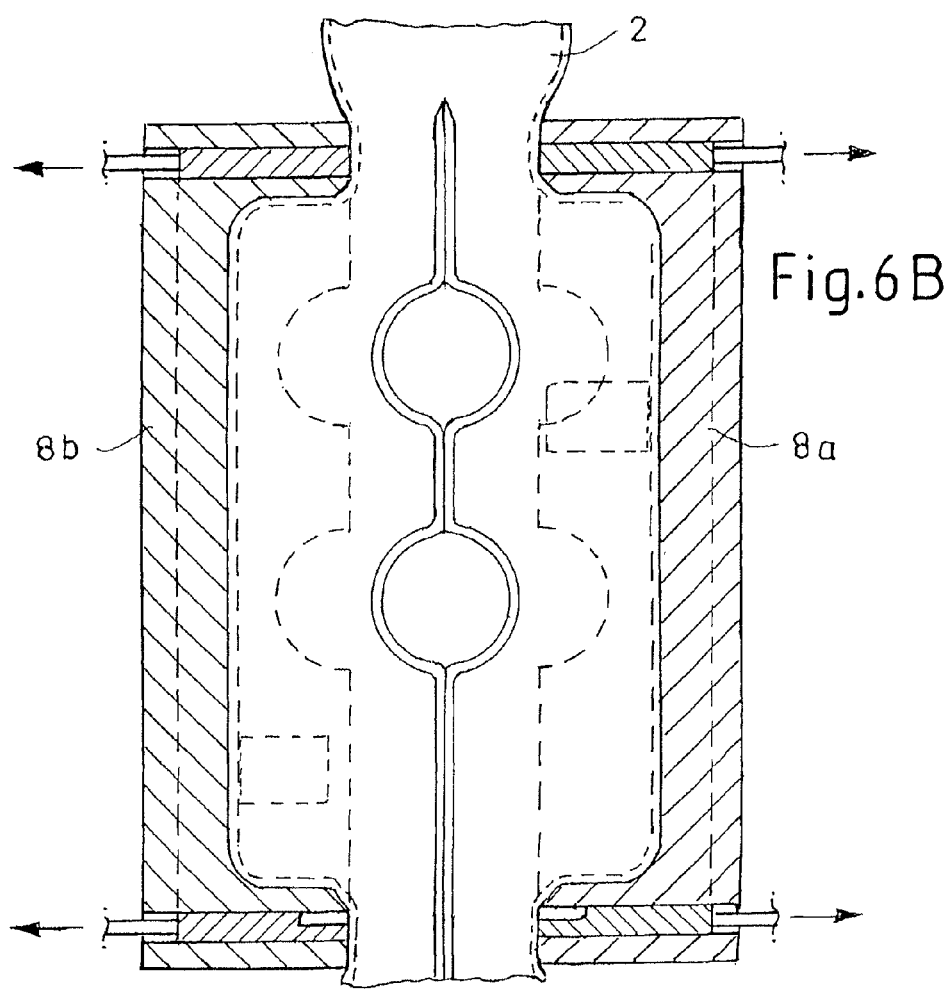
Figure 7A:
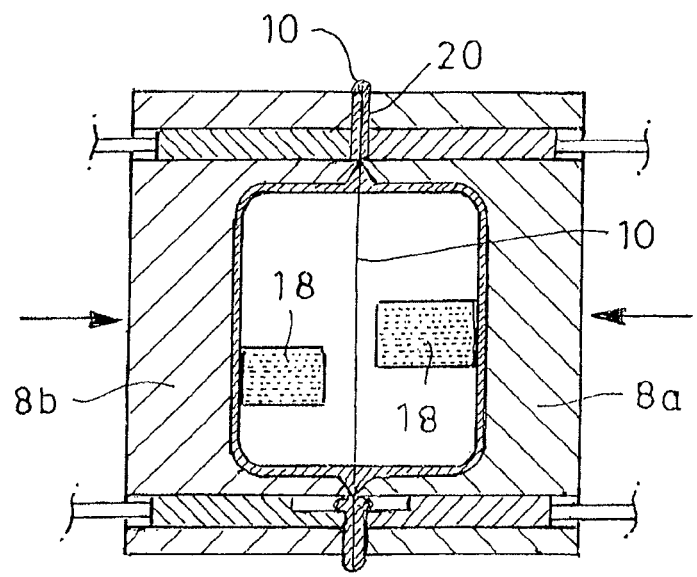
Figure 7B:
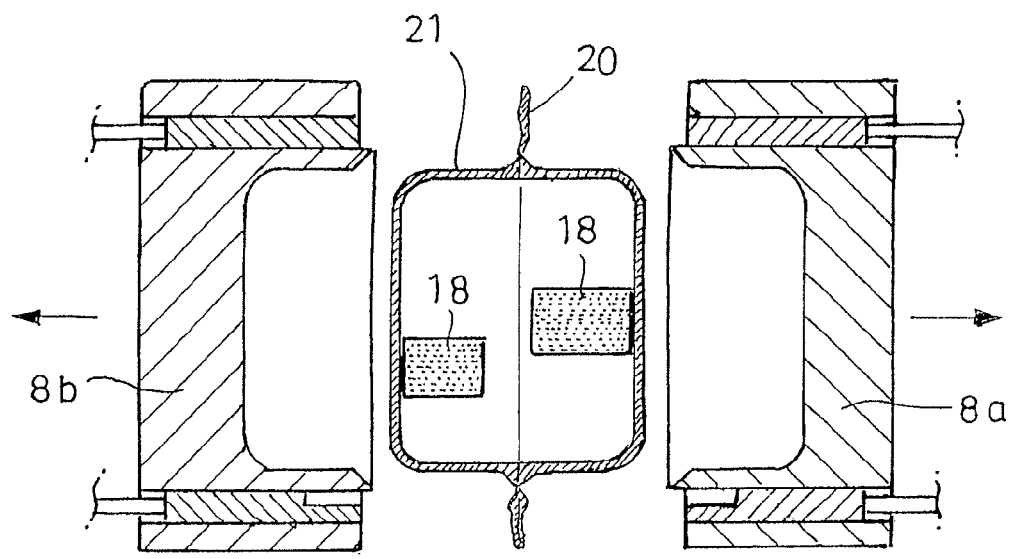

The invention is explained below by way of an exemplary embodiment shown in the drawings, in which:

FIG. 1 shows a perspective view of part of an extrusion head with the parison extending out of said extrusion head, FIG. 2 shows a sectional view along the lines II-I, II-II in FIG. 1, FIG. 3 shows a perspective view of a device for blow molding plastics material articles as claimed in the invention, the sequence of the method as claimed in the invention being illustrated, FIG. 4a shows a sectional view through the blow mold in FIG. 3 and the parison placed in position between the blow mold halves, FIG. 4b shows a top view in the direction of the arrow shown in 4a, FIG. 5a shows a part section through the blow mold with the blow mold halves closed prior to the parison being expanded, FIG. 5b shows a section along the lines B-B in FIG. 5a, FIG. 5c shows a section along the lines C-C in FIG. 5a after the parison has been pre-expanded, FIG. 5d shows a view corresponding to FIG. 5c, FIG. 5e shows a view corresponding to FIG. 5d illustrating an intermediate expansion of or the re-blowing of the parison once the part to be built-in has been inserted, FIG. 6a shows the open blow mold with the shape inducing means withdrawn, FIG. 6b shows a partial longitudinal section through the blow mold in the state shown in FIG. 6a, FIG. 7a shows a cross section through the blow mold in the closed state, FIG. 7b shows a cross section through the blow mold and the article when the article is being removed.

FIG. 1 first of all illustrates the step of the extrusion of a tube-shaped parison 2 as claimed in the invention. From the extrusion head given the reference 1, the tube-shaped parison of thermoplastic plastics material is initially ejected in the hot-melt state in a known manner through a slotted nozzle of the extrusion head 1. Extrusion can be effected in a continuous or an intermittent manner.

In the case of the exemplary embodiment shown here, it is provided for the parison tube 2 to be removed from the extrusion head 1 by means of a gripper and to be moved to a blow mold given the reference 6, as is illustrated in a schematic manner in FIG. 3. As an alternative to this, it can obviously be provided for the parison tube 2 to be extruded between the open parts of the blow mold 6. In addition, the blow mold can be arranged on a closing framework which can be moved in relation to the extrusion head.

The gripper 5 is shown in a greatly simplified manner in the drawings. Said gripper does not necessarily have to have a circular segment-shaped gripping element, rather it can have gripper segments arranged on a circular arc or a polygon with suction cups provided to take the parison tube 2 over. The removal of the parison tube 2 can be supported by a separating device for the parison tube 2. As an alternative to this, by narrowing the nozzle gap of the extrusion head a thin position can be generated in the parison tube 2 which makes it possible for the parison tube to be torn off by means of the gripper.

The exemplary embodiment shown shows a single-cavity mold, i.e. the blow mold includes blow mold halves 8a, 8b which in each case have cavities 7 which are complementary to each other and form one single mold cavity. As an alternative to this, it can be provided for the blow mold 6 to be realized as a so-called multiple-cavity mold.

Each of the blow mold halves 8a, 8b of the blow mold 6 is provided with slides 9a, 9b, 9c, 9d which are preferably extendible out of the parting plane of the blow mold 6 and retractable into said parting plane of the blow mold in a hydraulic manner. Said slides 9a, 9b, 9c, 9d serve as shape inducing means during the closing movement of the blow mold halves 8a, 8b and are referred to as such below.

As can be seen in particular from FIG. 3, the shape inducing means 9a, 9b, 9c, 9d in each case frame the cavities 7 of the blow mold halves 8a, 8b, or form an enclosure of the cavities 7 of the blow mold halves 8a, 8b, for reasons of a simplified representation the arrangement shown in the figure not being adapted to the contour of the cavities 7. In reality, the shape inducing means (slides) consist of several segments 9a, 9b, 9c, 9d, which are in each case adapted to the contour of the cavities in order to keep the accumulation of flash as small as possible. The shape inducing means can also be realized in one part.

Once the parison tube 2 has been moved into the position shown in FIG. 3, the blow mold halves 8a, 8b of the blow mold 6, with the shape inducing means 9a, 9b, 9c, 9d moved out of the parting plane 10, are moved toward each other such that the shape inducing means 9a, 9b, 9c, 9d assume the position shown in FIGS. 5a and 5b. Said shape inducing means clamp the parison tube 2 extensively thus forming a flash 11 between them. In said position the blow mold halves 8a, 8b are not completely closed, but are held at a spacing from each other by means of the shape inducing means 9a, 9b, 9c, 9d.

Recesses 12, which are complementary to each other in each case and which, when the shape inducing means 9a, 9b, 9c, 9d are moved toward one another, in each case form openings 13 through which the parting plane 10 of the closed blow mold halves 8a, 8b extends, are provided in the shape inducing means 9a, 9b, 9c, 9d on one of the end faces of the blow mold halves 8a, 8b, i.e. those faces which extend transversely with respect to the parting plane 10 of the blow mold 6. Said openings are in each case arranged in a symmetrical manner with reference to the imaginary parting plane 10. Once the shape inducing means 9a, 9b, 9c, 9d have been moved together, for example caused (forced) by the closing movement of the blow mold halves 8a, 8b, the parison tube 2 is crimped together thus forming the flash 11. A circumferential flash 11 is created only in the regions outside the openings 13. In the region of the openings 13 the parison 2, as is illustrated in FIGS. 5b and 5c, forms a closure of the opening 13. Once the shape inducing means 9a, 9b, 9c, 9d have been moved together, the parison tube 2 is initially pre-expanded inside the mold cavity formed by the cavities 7, for example by means of the blow mandrel 3 (FIG. 3), which, for example, when the mold cavity is closed, can be clamped in a known manner between the shape inducing means 9a, 9b, 9c, 9d or between the closing edges of the blow mold 6.

The parison tube 2 then abuts against the walls of the cavities 7 in the manner illustrated in FIG. 5c, depending on the selection of the blast pressure said parison tube entering into the openings 13 of the shape inducing means 9a, 9b, 9c or exiting from the same.

In a further method step, the parison 7, which is already pre-expanded in this manner, is separated in the region of the openings 13 or is provided with break-throughs. A separating device used for this purpose in the form of a hot blade, a laser cutting device or in the form of a so-called "pot cutter" (a cutting device with a cutting crown), is not shown in the drawing.

In the now open, expanded and partially shaped parison tube 2, as shown for example in FIG. 5d, parts 18 to be built-in can be inserted into the semi-finished article 16 by means of a multiaxial manipulator 17. Said parts to be built-in can be welded, riveted or bonded, for example, to the still-warm plastic wall of the semi-finished article 16.

At this point it must be stated again that the number and position of the parts to be built-in 18 and the type of the parts to be built-in 18 are not critical to the invention. In the present case, for example, the plastics material article to be produced can be a fuel container into which a surge tank is inserted as a part to be built-in 18.

In a further method step, a re-expanding or re-blowing of the semi-finished article 16 is provided by means of blow mandrels 14 which are attached so as to be pivotally movable on a blow mold half 8b. Said blow mandrels 14 can also be fastened on a separate device. This is illustrated, for example, in FIG. 5e. The blow mandrels 14 are provided in each case with a sealing collar 15 which seals the openings 13 against the shape inducing means 9a in this region. The re-blowing of the semi-finished article 16 serves the purpose of preventing possible creasing of the parison 2 in the region between the shape inducing means 9a, 9b, 9c, 9d and the sealing edges of the blow molds 8a, 8b.

In a further method step, the shape inducing means 9a, 9b, 9c, 9d are then retracted (see FIG. 6a) and the blow mold halves 8a, 8b perform a closing movement where the wall material of the semi-finished article 16 extending over the width of the gap 19 between the blow mold halves 8a, 8b is crimped together to form a further flash 20.

To provide a simplified representation, the gap 19 is shown excessively large in the drawings. The finished article 21 obtains the shape shown in FIGS. 7a and 7b. The blow mold halves 8a, 8b are opened or are moved apart from each other in the direction of the arrows shown in FIG. 7b and the finished article 21 can be removed by means of a removal device. The finished article 21 is then deflashed.

In the case of the exemplary embodiment shown in FIG. 3, the manipulator 17, which is realized as a triaxial robot arm, and the gripper 5, which is also triaxial, are arranged on opposite sides of the blow mold 6. As an alternative to this, they could be arranged on one side of the blow mold 6.

LIST OF REFERENCES

1 Extrusion head
2 Parison tube
3 Blow mandrel
5 Gripper
6 Blow mold
7 Cavities
8a, 8b Blow mold halves
9a-9d Shape inducing means
10 Parting plane
11 Flash
12 Recesses
13 Openings
14 Blow mandrel
15 Sealing collar
16 Semi-finished article
17 Manipulator
18 Part to be built-in
19 Gap
20 Flash
21 Finished article

What is claimed is:

1. A method for producing a plastics material article, said method comprising:
    extruding a tube-shaped parison and the re-forming of the parison into a hollow body within a blow mold by applying differential pressure, wherein initially a first expanding and partial shaping of the parison is carried out with the blow mold not completely closed, then at least one side opening is formed in a wall of the pre-expanded parison, in a next step at least one part to be built-in is introduced through the side opening into the interior of the partially shaped plastics material article, and in a further step the blow mold is closed completely and the blow molding of the plastics material article is completed.

2. The method as claimed in claim 1, characterized in that closing movement of the blow mold is effected in two steps, wherein in a first step of the closing movement at least one slide which frames the cavities of the blow mold, as shape inducing means, clamps the parison thus forming at least one opening between them.

3. The method as claimed in claim 2, characterized in that a pre-expanding of the parison is effected in such a manner that the parison abuts against the shape inducing means in the region of the opening formed by the shape inducing means, and in that the contour of the side opening of the parison is realized approximately corresponding to the contour of the opening formed by the shape inducing means.

4. The method as claimed in claim 2, characterized in that the amount of the pre-expanding is selected such that the parison extends out of the opening formed by the shape inducing means or extends into said opening.

5. The method as claimed in claim 2, characterized in that the side opening in the parison is generated from the outside through the opening formed by the shape inducing means by a cutting device.

6. The method as claimed in claim 2, characterized in that between the first step and the second step of the closing movement, first of all the parison is expanded into the blow mold halves and in a further step the part to be built-in is introduced.

7. The method as claimed in claim 2, characterized in that the part to be built-in is introduced through the opening formed by the shape inducing means.

8. The method as claimed in claim 1, characterized in that the part to be built-in is introduced into the partially shaped parison by a manipulator.

9. The method as claimed in claim 1, characterized in that after at least one part to be built-in has been introduced and prior to the blow mold being closed completely, the parison is re-expanded.

10. A device to produce a plastics material article from a tube-shaped parison, as claimed in the method as claimed in claim 1, said device including at least two blow mold halves which form a mold cavity and which carry out an opening and closing movement in relation to each other, wherein at least one blow mold half is provided with at least one slide which frames and forms an enclosure of the respective cavity as shape inducing means and is provided with at least one recess for forming a side opening in the parison.

11. The device as claimed in claim 10, characterized in that the shape inducing means are realized so as to be extendible into and retractable out of the parting plane of the blow mold halves.

12. The device as claimed in claim 10, characterized in that the shape inducing means are adapted to the contour of the cavities.

13. The device as claimed in claim 10, characterized in that the shape inducing means are provided in the region of the recess on an inwardly pointing side thereof with means for stretching the parison during the expanding of the same.

14. The device as claimed in claim 13, characterized in that at least one circumferential projection or a strip with increased surface roughness is provided as means for stretching the parison.

15. The device as claimed in claim 10, characterized in that the shape inducing means are provided in the region of the recess on an inwardly pointing side thereof with vacuum bores.

16. The device as claimed in claim 10, characterized in that the shape inducing means can be tempered.

17. The method as claimed in claim 2, wherein in the first step of the closing movement a plurality of slides which frame the cavities of the blow mold, as shape inducing means, clamp the parison thus forming at least one opening between them.

18. The method as claimed in claim 8, characterized in that the manipulator is a multiaxial manipulator.

19. The method as claimed in claim 9, characterized in that the parison is re-expanded by being acted upon by a blast of air.

20. The device as claimed in claim 10, wherein each mold half is provided with at least one slide which frames the respective cavity as shape inducing means and is provided with at least one recess for forming an opening.

* * * * *